United States Patent
Strachan

(10) Patent No.: US 10,908,176 B2
(45) Date of Patent: Feb. 2, 2021

(54) WIND SENSOR HOUSING

(71) Applicant: FT Technologies (UK) Ltd, Sunbury-on-Thames (GB)

(72) Inventor: Robin Strachan, Twickenham (GB)

(73) Assignee: FT Technologies (UK) Ltd, Sunbury-on-Thames (GB)

( * ) Notice: Subject to any disclaimer, the term of this patent is extended or adjusted under 35 U.S.C. 154(b) by 236 days.

(21) Appl. No.: 15/759,201

(22) PCT Filed: Sep. 9, 2016

(86) PCT No.: PCT/GB2016/052796
§ 371 (c)(1),
(2) Date: Mar. 9, 2018

(87) PCT Pub. No.: WO2017/046571
PCT Pub. Date: Mar. 23, 2017

(65) Prior Publication Data
US 2018/0252740 A1   Sep. 6, 2018

(30) Foreign Application Priority Data

Sep. 15, 2015   (GB) .................................. 1516320.7

(51) Int. Cl.
*G01P 1/02* (2006.01)
*G01P 5/24* (2006.01)
(Continued)

(52) U.S. Cl.
CPC ................ *G01P 1/026* (2013.01); *G01P 5/24* (2013.01); *G01F 1/662* (2013.01); *G01F 1/667* (2013.01); *G01F 15/14* (2013.01)

(58) Field of Classification Search
CPC . G01P 1/026; G01P 5/24; G01F 1/662; G01F 1/667; G01F 15/14
See application file for complete search history.

(56) References Cited

U.S. PATENT DOCUMENTS 2,842,762 A   7/1958   Zaleski
3,212,329 A   10/1965   Bisberg
(Continued)

FOREIGN PATENT DOCUMENTS

CN   101606070   12/2009
CN   102042846   5/2011
(Continued)

OTHER PUBLICATIONS

FT Technologies Ltd, "Acoustic Resonance Wind Sensors from FT Technologies," 2011 [retrieved online at https://web.archive.org/web/20110625083156/http://www.fttech.co.uk:80/ on Aug. 10, 2018].
(Continued)

*Primary Examiner* — Randy W Gibson
*Assistant Examiner* — John M Royston
(74) *Attorney, Agent, or Firm* — Sheppard, Mullin, Richter & Hampton LLP

(57) ABSTRACT

A housing 6 is provided for a wind sensor 2. A sensing element 4 is mounted in the housing 6 to measure the speed of the passing fluid flow, and the housing 6 comprises at least one surface 40, 42 having shaped surface elements 38, such as protrusions from and/or indentations in the surface 40, 42, for inducing turbulence in fluid flowing across the surface 40, 42. The turbulence caused by the shaped surface elements 38 results in the speed measured by the wind sensor 2 being less affected by uncontrolled transitions between laminar and turbulent airflow, and thus enables more accurate calibration of the wind sensor 2.

16 Claims, 3 Drawing Sheets

(51) Int. Cl.
*G01F 15/14* (2006.01)
*G01F 1/66* (2006.01)

(56) References Cited

U.S. PATENT DOCUMENTS

| | | | |
|---|---|---|---|
| 3,217,536 A | 11/1965 | Motsinger | |
| 5,343,744 A * | 9/1994 | Ammann | G01P 5/245 73/170.11 |
| 2004/0154383 A1* | 8/2004 | Woolf | G01F 1/383 73/53.01 |
| 2013/0180342 A1* | 7/2013 | Shen | G01F 1/662 73/861.25 |

FOREIGN PATENT DOCUMENTS

| | | |
|---|---|---|
| CN | 102707084 | 10/2012 |
| CN | 102756805 | 10/2012 |
| CN | 103219636 | 7/2013 |
| CN | 103592330 | 2/2014 |
| CN | 203660265 | 6/2014 |
| CN | 104769441 | 7/2015 |
| EP | 0801311 | 10/1997 |
| ES | 2348800 | 12/2010 |

OTHER PUBLICATIONS

GB Patent Application No. GB1516320.7, Combined Search and Examination Report dated Feb. 10, 2016.
International Application No. PCT/GB2016/052796, International Search Report and Written Opinion dated Dec. 6, 2016.
FT Technologies Ltd, "FT702LT Ultrasonic Heavy Duty Wind Sensor," Aug. 5, 2014 [retrieved online at http://fttech.co.uk/uploads/files/1/Resource/A4236-2-EN-Meteorology-Datasheet_Web.pdf on Jun. 12, 2018].

* cited by examiner

WIND SENSOR HOUSING

CROSS-REFERENCE TO RELATED APPLICATIONS

This application is a national stage application pursuant to 35 U.S.C. § 371 of International Application No. PCT/GB2016/052796 filed Sep. 9, 2016, which claims priority to United Kingdom Patent Application No. 1516320.7 filed Sep. 15, 2015, the disclosures of which are hereby incorporated by reference herein.

FIELD OF THE DISCLOSURE

This disclosure relates to a housing for a wind sensor, and to a wind sensor incorporating the housing.

BACKGROUND TO THE DISCLOSURE

Wind sensors are available for measuring the speed of flow of air or fluid in a free field. It is desirable or essential in many applications for the measurement of the speed of the fluid to be accurate.

The wind speed measurements made by a wind sensor may be affected by variations in the orientation of the wind sensor with respect to the airflow and by the transition from laminar to turbulent flow in the vicinity of the wind sensor, leading to errors in the measured wind speed.

The present invention seeks to provide a novel housing for a wind sensor.

DETAILED DESCRIPTION OF PREFERRED EMBODIMENTS

Figure 1:
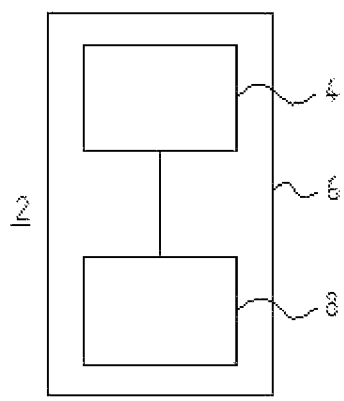
FIG. 1 is a schematic block diagram of the main elements of a wind sensor in accordance with one embodiment of the disclosure.
Figure 2:
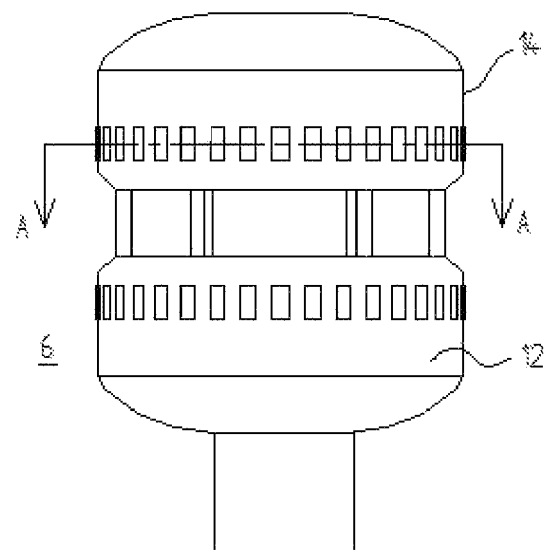
FIG. 2 is a side view of a portion of a wind sensor in accordance with one embodiment.
Figure 3:
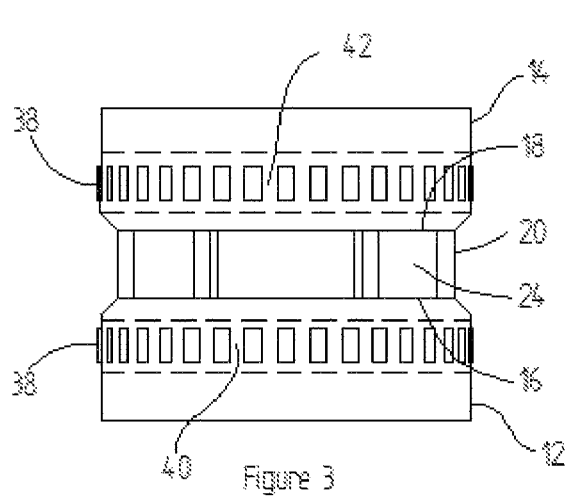
FIG. 3 is a side view of a central portion of the housing of the wind sensor shown in FIG. 2.
Figure 4:
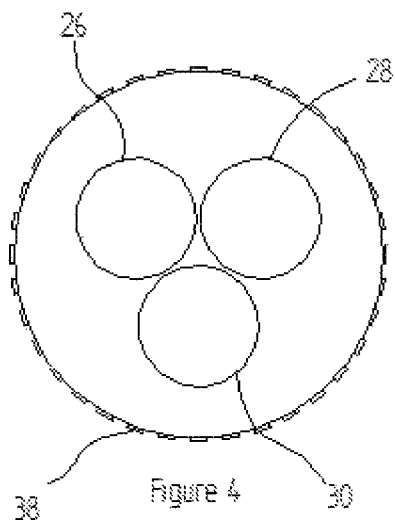
FIG. 4 is a horizontal cross-sectional view through section AA in FIG. 2.

According to an aspect of the disclosure there is provided a housing for a wind sensor. The housing comprises a first housing body having a cylindrical cross-section, a second housing body having a cylindrical cross-section, a first reflector in the first housing body and a second reflector in the second housing body and coaxially mounted with the first reflector so as to define a resonant cavity between the first reflector and the second reflector. The housing has at least one surface comprising one or more shaped surface element(s) for inducing turbulence in fluid flowing across the surface. The one or more shaped surface element(s) are arranged on a surface extending around the perimeter of the first housing body and/or of the second housing body and/or within the resonant cavity.

According to another aspect of the disclosure, there is provided a housing for a wind sensor, having at least one surface comprising one or more shaped surface elements for inducing turbulence in fluid flowing across the surface.

According to a further aspect of the disclosure, there is provided a wind sensor comprising a housing in accordance with any of the preceding aspects of the disclosure.

The housing in accordance with embodiments of the disclosure mitigates the errors associated with the orientation of the wind speed sensor with respect to the airflow and the transition between laminar and turbulent flow.

Specific embodiments are described below, by way of example only, with reference to the accompanying drawings.

Embodiments of a wind sensor of the disclosure will now be described with reference to FIGS. 1 to 6. In one embodiment, the fluid being measured is air. However, the speed of other moving fluids can be measured with wind sensors having the disclosed housing. The terms "wind sensor" and "airflow" should therefore be understood accordingly, and the embodiments extend to fluid flow sensors in general.

Referring to the accompanying Figures, a wind sensor 2 comprises a sensing element 4, for sensing wind speed and generating electrical signals associated with the wind speed, and a housing 6, for housing the sensing element 4. The wind sensor 2 also has a processing element 8 that is electrically coupled to the sensing element 4 for processing the electrical signals generated by the sensing element 4 in order to determine a wind speed measurement. In the disclosed embodiments, the housing 6 houses the processing element 8 in addition to the sensing element 4, but this is not essential.

In the disclosed embodiment, the housing 6 is substantially cylindrical and comprises a first housing body portion 12 and a second housing body portion 14 coaxially arranged as housing 6. Both the first housing body portion 12 and the second housing body portion 14 are also substantially cylindrical.

In the disclosed embodiment, the sensing element 4 uses the principle of acoustic resonance in order to sense the speed of the passing airflow. The first housing body portion 12 is provided with a flat surface as a first reflector 16 and the second housing body portion 14 is provided with a flat surface as a second reflector 18. The first reflector 16 and second reflector 18 are circular plates. The first reflector 16 and the second reflector 18 are arranged to be parallel to each other, and are spaced at a distance D from each other by means of a plurality of spacers 20 located at intervals around the perimeter of the first reflector 16 and second reflector 18. The first reflector 16 and the second reflector 18 define a resonant cavity 24, forming a measurement cavity of the sensing element 4, in the space between the first reflector 16 and the second reflector 18.

In the disclosed embodiment, the first housing body portion 12, second housing body portion 14, first reflector 16, second reflector 18 and spacers 20 are integral parts of the housing 6, and are formed by machining a cylindrical piece of metal. At least one of the first housing body portion 12 and second housing body portion 14 can be made hollow to receive transducers (described later) and electronic circuitry as necessary. In other embodiments, first housing body portion 12 may be formed separately from second housing body portion 14.

The resonant cavity 24 is open to fluid flow and is occupied by the fluid whose speed is to be measured. In the disclosed embodiment, the resonant cavity 24 contains air that is free to flow through the resonant cavity 24 in any direction.

In the disclosed embodiment, the wind sensor 2 is provided with three electro-acoustic transducers 26, 28, 30 mounted on the second reflector 18 and arranged to emit acoustic signals into the resonant cavity 24 and to receive acoustic signals from the resonant cavity 24.

The acoustic signals received by the transducers 26, 28, 30 are converted to electrical signals and the electrical signals are passed to the processing element 8 for processing to determine the speed of the airflow. In the disclosed embodiment, the processing element 8 also operates to generate the electrical excitation signals applied to the transducers 26, 28, 30 to cause the transducers 26, 28, 30 to emit acoustic signals within the resonant cavity 24.

In the disclosed embodiment, therefore, the sensing element 4 comprises the first reflector 16 and the second reflector 18 that define the resonant cavity 24, and the three transducers 26, 28, 30. In the disclosed embodiment, the sensing element 4 operates as described in European patent publication EP 0801311 B to determine an airflow measurement. The wind direction can be determined from wind speed measurements made between different pairs of transducers 26, 28, 30 as explained in detail in EP 0801311 B.

At least one shaped surface element 38 is provided on or applied to a surface 40, 42 of housing 6. The housing 6 therefore has at least one surface 40, 42 comprising one or more shaped surface elements 38. In the disclosed embodiment, shaped surface elements 38 are provided on surface 40 of the first housing body portion 12 and surface 42 of the second housing body portion 14. In other embodiments, shaped surface elements 38 may be provided on only one surface 40, 42 of housing 6.

The surfaces 40, 42 on which the shaped surface elements 38 are provided or arranged are surfaces over which the fluid, in this case air, flows as it passes the housing 6. Shaped surface elements 38 induce turbulence in the airflow across the surface 40, 42 of the housing 6.

The surfaces 40, 42 extend around the perimeter of the housing 6. The housing 6 of the disclosed embodiment is generally cylindrical and so the surfaces 40, 42 extend around the whole circumference of the housing 6. The presence of shaped surface element(s) 38 around the whole circumference results in uniform performance of the wind sensor 2 irrespective of the radial direction of the wind, i.e. the location around the circumference at which the wind is incident. However, in some embodiments the surface 40, 42 on which the shaped surface elements 38 are provided may extend over only a portion of the perimeter or circumference of the housing 6.

In the disclosed embodiment, the surfaces 40, 42 are of limited longitudinal extent, that is they extend over just part of the height of the housing (which may be the length of the cylinder). The surfaces 40, 42 are adjacent the sensing element 4 provided by the resonant cavity 24 acting as a measurement cavity. In some embodiments, the surfaces 40, 42 extend over the whole length of the housing 6.

In the disclosed embodiment, a shaped surface element 38 is integral with the surface 40, 42 on which it is provided. In the disclosed embodiments, shaped surface elements 38 result from machining of the surfaces 40, 42 of the housing 6. In other embodiments the shaped surface elements 38 may be separate from the housing 6 and may be applied or affixed to the surface 40, 42.

In one embodiment, a shaped surface element 38 comprises a protrusion from the surfaces 40, 42. The height of the protrusion is generally at least 0.1 mm (0.0001 m) and is typically in the range 0.1 mm to 1 mm (0.0001 m to 0.001 m).

In one embodiment a shaped surface element 38 comprises a recess or an indentation into the surface 40, 42. The depth of the indentation is generally at least 0.1 mm (0.0001 m) and is typically in the range 0.1 mm to 1 mm (0.0001 m to 0.001 m).

In the disclosed embodiment, a plurality of shaped surface elements 38 protrude from the surface 40, 42 to a uniform height or are recessed into the surface 40, 42 to a uniform depth.

In some embodiments, adjacent shaped surface elements 38 applied to a surface 40, 42 are not identical. A variation in the applied shaped surface elements 38 may result in a greater degree of turbulence being provided by the shaped surface elements 38.

In some embodiments the shaped surface elements 38 may comprise both protrusions from a surface 40, 42 and indentations into that surface 40, 42. In some embodiments, protruding shaped surface elements 38 and indented shaped surface elements 38 alternate in the direction around the perimeter or circumference of the housing 6 and/or in the longitudinal direction of the housing 6. The alternation of recessed and protruding shaped surface elements 38 can provide increased turbulence.

In the disclosed embodiment, the shaped surface elements 38 are uniformly spaced on the surface 40, 42. The uniform spacing of the shaped surface elements 38 may result in uniform performance of the wind sensor 2 irrespective of the relative direction of the wind.

The shaped surface elements 38 may be provided at uniform angular separation around the perimeter or circumference of the housing 6. The uniform separation of the shaped surface element(s) 38 around the perimeter or circumference of the housing 6 results in uniform performance of the wind sensor 2 irrespective of the radial direction of the wind. In the disclosed embodiment, thirty-six shaped surface elements 38 are provided around the circumference of the housing 6 at an angular separation of 10 degrees between adjacent surface elements 38.

In the disclosed embodiment, the shaped surface elements 38 are of uniform size. The uniform size of the shaped surface elements 38 may result in uniform performance of the wind sensor 2 irrespective of the radial direction of the wind.

In the disclosed embodiment, the length of a shaped surface element 38, meaning the extent of a shaped surface element 38 in the longitudinal direction of the housing 6, is generally at least 2 mm (0.002 m) and is typically in the range 5 mm to 15 mm (0.005 m to 0.015 m). In some embodiments a shaped surface element 38 may extend along the entire height of the first housing body portion 12 and/or along the entire height of the second housing body portion 14.

In the disclosed embodiment, the width of a shaped surface element 38, meaning the extent of a shaped surface element 38 in the circumferential direction of the housing 6, is generally at least 2 mm (0.002 m) and is typically in the range 3 mm to 15 mm (0.003 m to 0.015 m). In some embodiments a shaped surface element 38 may extend around the perimeter or circumference of housing 6.

In the disclosed embodiments, a shaped surface element 38 is generally rectangular in plan view and in cross-sectional profile, e.g. cuboid. In other embodiments, a shaped surface element 38 having square, oval, triangular and other shapes in plan view and cross-sectional profile work effectively and may be easier to fabricate by automated tools. In one embodiment all of the shaped surface elements 38 are identical. Different plan or profile shapes may be used for each of a plurality of shaped surface elements 38 in some embodiments. The use of a plurality of non-identical shaped surface elements 38 may create a greater degree of turbulence.

Shaped surface elements 38 of the disclosed embodiments induce turbulence in the fluid flowing across the surface 40, 42 of the housing 6 at practical wind speeds encountered by the wind sensor 2, for example for wind speeds greater than 3 m/s.

The fluid flow around an object is laminar or turbulent depending on factors such as the viscosity of the fluid, the speed of fluid flow, and the shape of the object or the orientation of the object with respect to the fluid flow, and can be analysed using Reynolds numbers. Laminar flow of a fluid occurs at low Reynolds numbers, and is characterised by smooth fluid motion. At high Reynolds numbers, a fluid exhibits turbulent flow. In air, the boundary between laminar flow of the air and turbulent follow of the air often occurs at a Reynolds number of around $10^5$.

Figure 5:
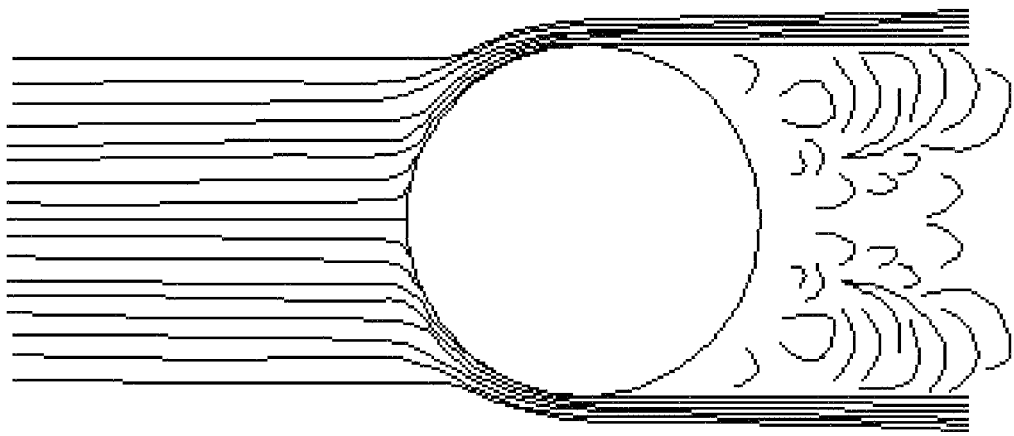
FIG. 5 is a sketch showing a plan view of separated laminar flow around a cylindrical object.
Figure 6:
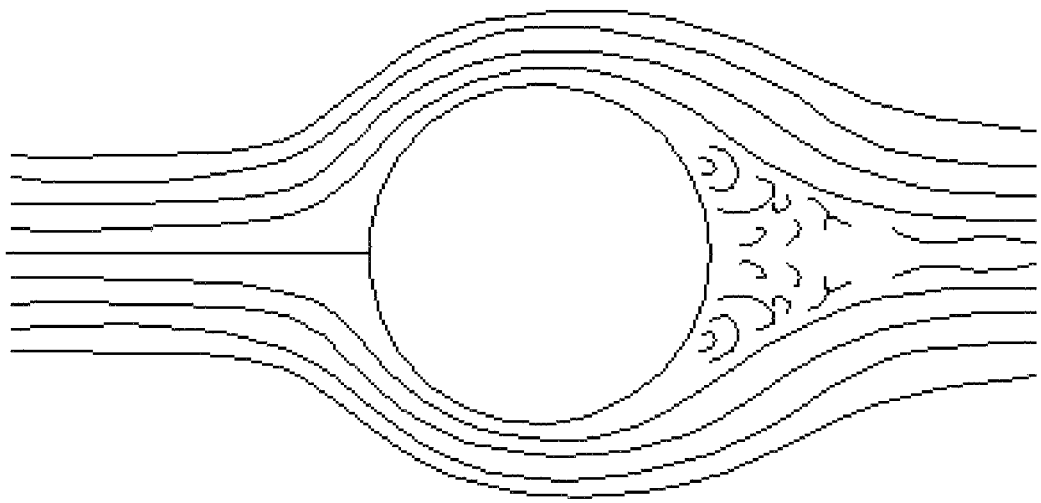
FIG. 6 is a sketch showing a plan view of separated turbulent flow around a cylindrical object.
Figure 7:
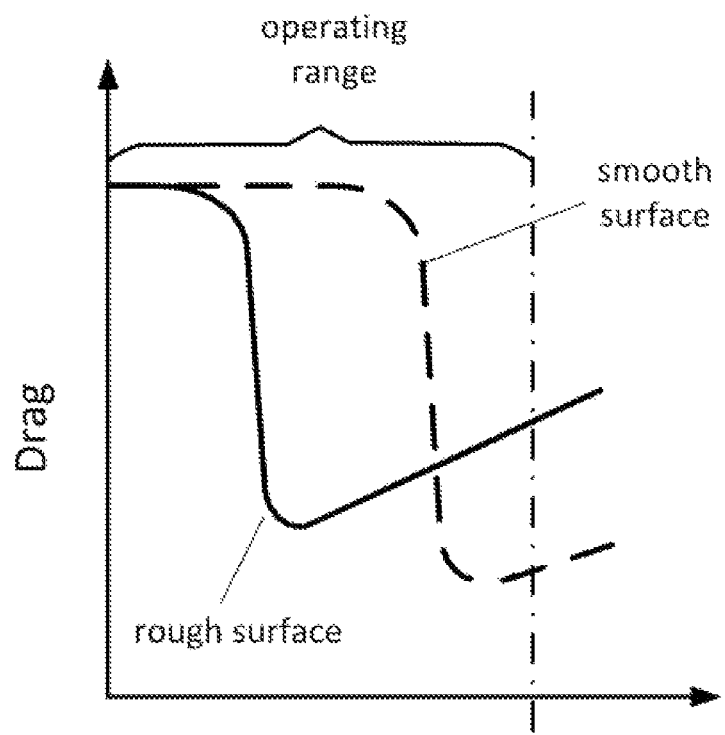
FIG. 7 shows the relationship between Reynolds number, drag and surface properties.

The differences between laminar fluid flow around a cylindrical object and turbulent fluid flow around a cylindrical object can be understood more clearly from a consideration of FIGS. 5 to 7.

FIG. 5 shows fluid flow around a cylinder at a given flow speed. As can be seen, the fluid flow is laminar at the sides of the cylinder but detaches from the cylinder creating a large low pressure region at the lee side of the cylinder. In this scenario the cylinder causes a considerable amount of drag.

FIG. 6 shows a different form of fluid flow around a cylinder prevalent at flow speeds higher than those experienced in the arrangement shown in FIG. 5. A turbulent boundary layer follows the sides of the cylinder. In contrast to the flow conditions seen in FIG. 5, the fluid flow in FIG. 6 follows the contour of the cylinder further to the lee side of the cylinder. In this flow configuration the low pressure region is smaller and thus the drag is reduced.

The graph in FIG. 7 illustrates the dependence of drag on Reynolds number. The Reynolds number is a well-known quantity that is proportional to the relative velocity of fluid flow over the surface of an object. As can be seen, at low Reynolds numbers/slow fluid flow velocity, drag is high. At these flow speeds the laminar fluid flow conditions shown in FIG. 5 exist. As the fluid flow velocity/Reynolds number increases, however, the turbulent fluid flow conditions develop, leading to a drastic and sudden reduction in drag at a Reynolds number that is specific to the object over which the fluid flows. It was realised that sudden changes between laminar and turbulent fluid flow conditions affect the measurement accuracy of fluid speed sensors considerably and that consequently it is desirable that, as far as possible, such changes should be caused to occur at low wind speeds where the effect of drag is minimal.

In the example shown in FIG. 7 the operating range starts at a fluid flow speed of zero and extends to a maximum fluid flow speed. At low fluid flow speeds the flow conditions shown in FIG. 5 are prevalent, so that high drag is experienced. At the upper end of the operating range illustrated in FIG. 7 the fluid flow conditions illustrated in FIG. 6 are prevalent and a correspondingly smaller amount of drag is experienced. As can be seen from FIG. 7, the transition between these two states is an abrupt one. Experiments have shown that, for a smooth walled version of the fluid flow sensor of the type shown in FIGS. 2 and 3 (that is a fluid sensor that does not comprise the shaped surface elements included in the embodiment shown in these figures) and at constant fluid flow speeds despite the seeming symmetry of the sensor a switch or alternating switches between laminar and turbulent fluid flow conditions can occur and affect measurement accuracy considerably. It was in particular surprisingly found that even a small change in the direction of incidence of the fluid flow upon the sensor can cause significant changes in the measured fluid flow speed. Without wishing to be bound by theory it is believed that such changes in the direction of incidence of the fluid flow exposes the plurality of spacers 20 to the fluid flow in a manner that, dependent on the angle of incidence of the fluid flow upon the sensor housing, causes either laminar or turbulent flow of fluid around the sensor. In accordance with FIG. 7, this is believed to cause a step change in the amount of drag experienced by the fluid flow.

As also illustrated in FIG. 7, the transition between the high and low drag fluid flow states happens at different Reynolds Numbers for smooth walled objects and objects with a roughened surface. It was realised that the sensitivity of the sensor to these changes flow condition is higher for high fluid flow speeds than it is for lower fluid flow speeds. It was consequently recognised that the use of the shaped surface elements introduced herein is desirable. It was moreover found that, as also shown in FIG. 7, the magnitude of the change in drag when transition between the two flow conditions is less for transitions at lower Reynolds numbers than for transitions at higher Reynolds numbers.

Figure 8:
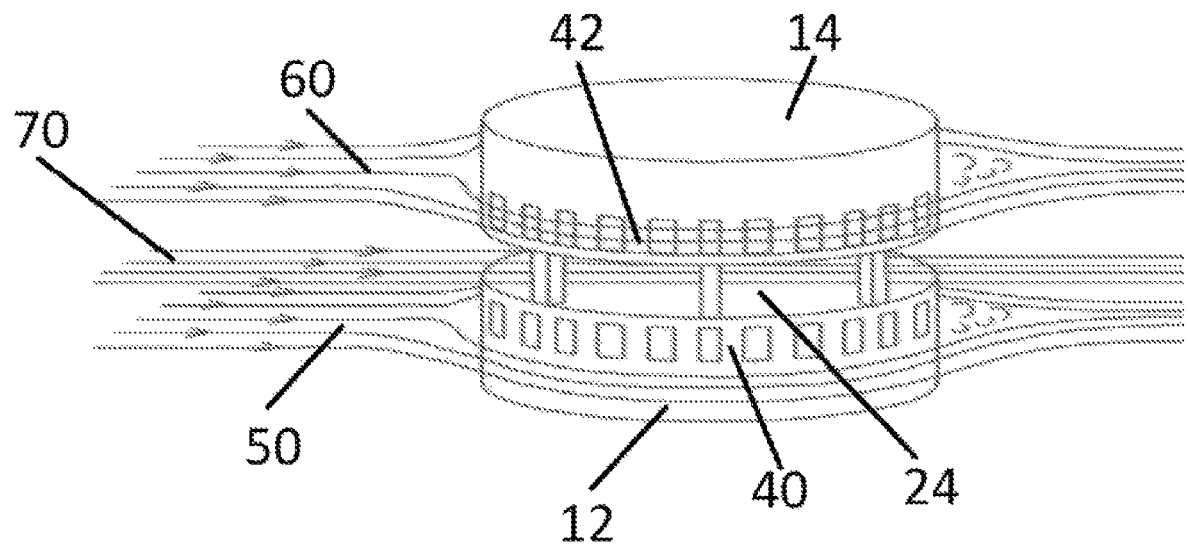
FIG. 8 illustrates fluid flow over a fluid flow sensor.

FIG. 8 illustrates fluid flow incident on the sensor housing of an embodiment. The fluid flow can be considered to comprise a component 50 that is incident upon the first housing portion 12, a component 60 that is incident upon the first housing portion 14 and a component 70 that flows through the resonant cavity 24. In the smooth walled sensor housing in which this effect was observed it can only be the flow component 70 that causes the above described fluctuations in velocity measurements. It was surprisingly found that, despite this, the addition of the above discussed shaped surface elements 38 to surfaces 40 and 42 alleviates this problem so that fluctuations in flow speed measurements are reduced or eliminated. This is surprising, given that the shaped surface elements 38 act upon flow components 50 and 60 if they are provided on both surfaces 40 and 42 or on just one of flow components 50 and 60 if they are provided on only one of surfaces 40 and 42. Without wishing to be bound by theory it is believed that the shaped surface element 38 on surfaces 40 and/or 42 cause turbulent flow in the lee of the first and/or second housing body portions 12/14 as indicated in FIG. 8 and akin to the flow pattern shown in FIG. 6. It is believed that by imposing this flow pattern upon flow components 50 and/or 60 the pressure downstream of the first and/or second sensor housing body portions 12/14 changes in a manner that also affects the flow component 70 so that a change in the angle of incidence of the fluid flow component 70 upon supports 20 is not sufficient to cause the flow component 70 to adopt a laminar flow pattern. The transition from laminar fluid flow to turbulent fluid flow for the entire sensor thus occurs at lower Reynolds numbers/flow speed in a part of the operating range of the sensor in which the transition has a reduced effect on measurement accuracy. The entire sensor would therefore operate in accordance with the solid line shown in FIG. 7. The turbulent flow in the boundary layer of the air flow around the wind sensor 2 caused by the shaped surface elements 38 affects the global flow pattern around the wind sensor 2. Thus, changes in measured airflow will always reflect changes in the true wind speed, instead of reflecting changes between laminar fluid flow and turbulent fluid flow around the wind sensor 2. Inaccuracies in the calibration of the wind sensor 2 owing to unpredictable changes between laminar fluid flow and turbulent fluid flow around the wind sensor 2 can therefore be avoided.

Embodiments of the disclosure therefore provide a housing 6 for a wind speed sensor 2. The housing 6 causes turbulence in the airflow, and the global flow pattern is substantially less sensitive to wind orientation, wind turbulence level and contamination of the wind sensor surfaces. As a result, inaccuracies in wind speed caused by unpredictable switching between laminar flow and turbulent flow can be reduced or eliminated and the calibration of the wind sensor 2 accomplished more accurately. Since wind direction can be calculated from a number of wind speed measurements, the measurement of the wind direction is also improved.

In the disclosed embodiments, the shaped surface elements 38 are arranged on surfaces over which the air flows as it passes the wind sensor 2. However, shaped surface elements 38 may be additionally or alternatively provided within the resonant cavity 24.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present disclosure.

The invention claimed is:

1. A housing for a fluid-speed sensor, the housing comprising:
    a first housing body having a first cylindrical cross-section, the first housing body having a first exterior surface extending around a first perimeter of the first housing body;
    a second housing body having a second cylindrical cross-section, the second housing body having a second exterior surface extending around a second perimeter of the second housing body;
    a first reflector in the first housing body; and
    a second reflector in the second housing body and coaxially mounted with and spaced apart from the first reflector so as to define a measurement cavity between the first reflector and the second reflector, the first reflector comprising one or more sensing elements configured to sense speed of a first fluid portion flowing in the measurement cavity;
    the first exterior surface and/or the second exterior surface comprising one or more shaped surface element(s) for inducing turbulence in a second fluid portion flowing across the first exterior surface or the second exterior surface and for modifying a transition between laminar and turbulent flow of the first fluid portion flowing in the measurement cavity, the one or more shaped surface element(s) being arranged on the first exterior surface around the first perimeter of the first housing body and/or on the second exterior surface around the second perimeter of the second housing body.

2. The housing as claimed in claim 1, wherein at least one shaped surface element of the one or more shaped surface element(s) comprises a protrusion.

3. The housing as claimed in claim 1, wherein at least one shaped surface element of the one or more shaped surface element(s) comprises a recess.

4. The housing as claimed in claim 1, wherein at least one shaped surface element of the one or more shaped surface element(s) is integral with the first exterior surface or the second exterior surface.

5. The housing as claimed in claim 1, comprising a plurality of shaped surface elements, wherein the plurality of shaped surface elements are uniformly spaced apart from each other.

6. The housing as claimed in claim 1, comprising a plurality of shaped surface elements, wherein the plurality of shaped surface elements are of uniform size.

7. The housing as claimed in claim 1, wherein the one or more shaped surface elements induce turbulence in the second fluid portion flowing across the first exterior surface or the second exterior surface at a speed greater than 3 m/s.

8. The housing as claimed in claim 1, wherein the measurement cavity is a resonant cavity and the one or more sensing elements are configured to use acoustic resonance to sense the speed of the first fluid portion flowing in the measurement cavity.

9. A fluid-speed sensor comprising a housing, the housing comprising:
    a first housing body having a first cylindrical cross-section, the first housing body having a first exterior surface extending around a first perimeter of the first housing body;
    a second housing body having a second cylindrical cross-section, the second housing body having a second exterior surface extending around a second perimeter of the second housing body;
    a first reflector in the first housing body; and
    a second reflector in the second housing body and coaxially mounted with and spaced apart from the first reflector so as to define a measurement cavity between the first reflector and the second reflector, the first reflector comprising one or more sensing elements configured to sense speed of a first fluid portion flowing in the measurement cavity;
    the first exterior surface and/or the second exterior surface comprising one or more shaped surface element(s) for inducing turbulence in a second fluid portion flowing across the first exterior surface or the second exterior surface and for modifying a transition between laminar and turbulent flow of the first fluid portion flowing in the measurement cavity, the one or more shaped surface element(s) being arranged on the first exterior surface around the first perimeter of the first housing body and/or on the second exterior surface around the second perimeter of the second housing body.

10. The fluid-speed sensor as claimed in claim 9, wherein at least one shaped surface element of the one or more shaped surface element(s) comprises a protrusion.

11. The fluid-speed sensor as claimed in claim 9, wherein at least one shaped surface element of the one or more shaped surface element(s) comprises a recess.

12. The fluid-speed sensor as claimed in claim 9, wherein at least one shaped surface element of the one or more shaped surface element(s) is integral with the first exterior surface or the second exterior surface.

13. The fluid-speed sensor as claimed in claim 9, wherein the housing comprises a plurality of shaped surface elements, wherein the plurality of shaped surface elements are uniformly spaced apart from each other.

14. The fluid-speed sensor as claimed in claim 9, wherein the housing comprises a plurality of shaped surface elements, wherein the plurality of shaped surface elements are of uniform size.

15. The fluid-speed sensor as claimed in claim 9, wherein the one or more shaped surface elements induce turbulence in the second fluid portion flowing across the first exterior surface or the second exterior surface at a speed greater than 3 m/s.

16. The fluid-speed sensor as claimed in claim 9, wherein the measurement cavity is a resonant cavity and the one or more sensing elements are configured to use acoustic resonance to sense the speed of the first fluid portion flowing in the measurement cavity.

* * * * *